Figure 1:
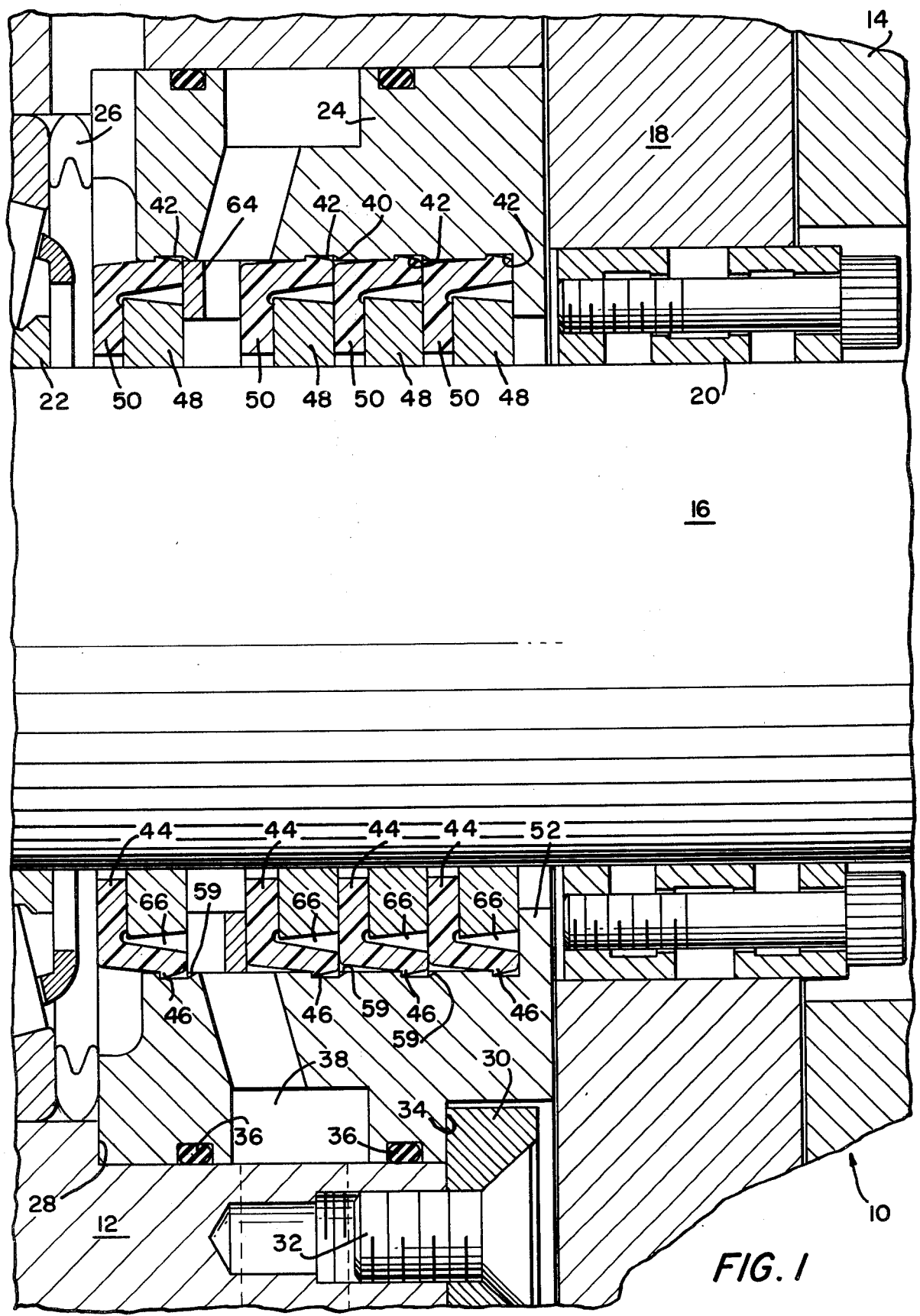

United States Patent [19]

Howe

[11] 4,139,204
[45] Feb. 13, 1979

[54] SEAL HOUSING MEANS

[75] Inventor: Frank D. Howe, Painted Post, N.Y.

[73] Assignee: Ingersoll-Rand Company, Woodcliff Lake, N.J.

[21] Appl. No.: 738,652

[22] Filed: Nov. 4, 1976

[51] Int. Cl.² .................. F16J 15/40; F16D 17/00
[52] U.S. Cl. ........................... 277/123; 277/189
[58] Field of Search ............ 277/189, 123, 124, 125, 277/179, 178

[56] References Cited
U.S. PATENT DOCUMENTS

| | | | |
|---|---|---|---|
| 1,776,911 | 9/1930 | Jones | 277/123 |
| 3,348,849 | 10/1967 | Newcomb et al. | 277/27 |
| 3,377,073 | 4/1968 | Harney | 277/27 |
| 3,438,638 | 4/1969 | Newcomb et al. | 277/27 |
| 3,467,395 | 9/1969 | Kan | 277/178 |
| 3,741,615 | 6/1973 | Otto | 277/179 |
| 3,743,305 | 7/1973 | Berens et al. | 277/189 |
| 3,989,259 | 11/1976 | Lorenz | 277/179 |

Primary Examiner—Robert I. Smith
Attorney, Agent, or Firm—Bernard J. Murphy

[57] ABSTRACT

The means comprise a housing for a seal defined as a generally cup-shaped retainer, the wall of which is resiliently compressible in order that the retainer might be pressed into a cartridge or housing to retain a seal therewithin, in which the outer surface of the wall of the retainer has an annular lip which snaps into engagement with an annular groove formed therefor in the housing. The use of a plurality of the seal housing means, in stacked relationship, for sealing along a shaft or the like, provides an optimum spacing of the retained seals lengthwise of the shaft.

8 Claims, 2 Drawing Figures

SEAL HOUSING MEANS

This invention pertains to arrangements for sealing shafts, and the like, and in particular to means for housing a seal, for fluid-sealing a shaft and the like, which is simple and economic of manufacture, and proposed to be expendable.

Means for housing seals, in the prior art, ordinarily require an annular groove to receive a separate, engaging retaining ring, or are secured in place by separate retaining rings at opposite axial ends thereof, and other such arrangements are known and commonly practiced to secure a seal housing in a proper and desired positioning.

It is an object of this invention to set forth an improved seal housing which requires no extraneous components such as retaining rings, set screws, or the like properly to position the seal housing in place. Particularly it is an object of this invention to set forth means for housing a seal for fluid-sealing a shaft, comprising first means comprising an annular housing for enveloping a portion of a shaft; a second means comprising a generally cup-shaped, circular seal retainer for receiving a seal therewithin; wherein one of said first and second means has a groove formed therein; the other of said first and second means has a lip formed thereon; said groove and said lip comprising, respectively, first and second locking elements, for locking said seal retainer within said housing; and said retainer is disposed within said housing with said lip locked in said groove.

It is another object of this invention to disclose an improved seal retainer means, for use in combination with a seal housing for fluid-sealing a shaft, comprising a generally cup-shaped, circular seal retainer; said retainer having a generally flat and centrally-apertured base and an annular wall rising from the periphery of said base; said base and wall cooperating to define an annular walled recess within which to receive a seal; wherein a surface of said wall has means for lockingly engaging a surface of a seal housing.

Figure 2:
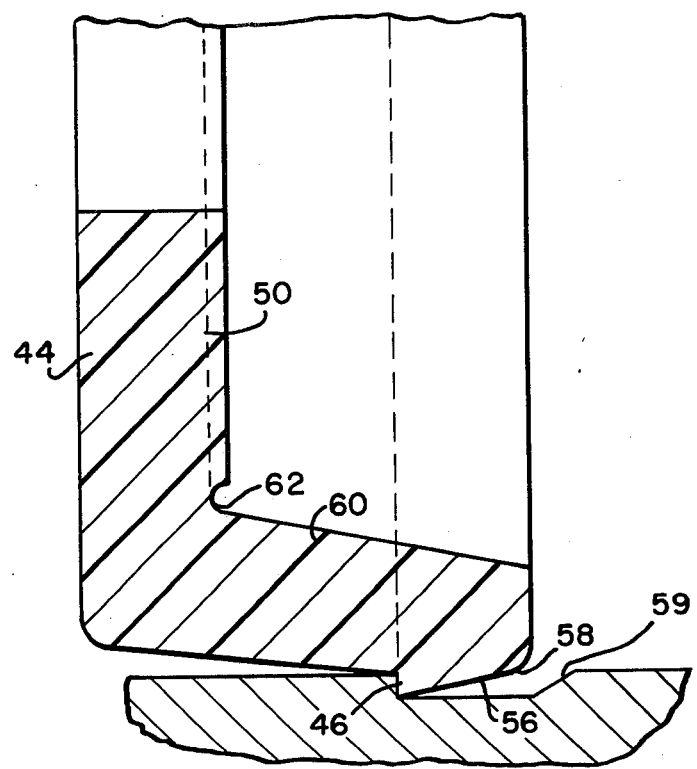

Further objects of this invention, as well as the novel features thereof, will become more apparent by reference to the following description taken in conjunction with the accompanying figures, in which:

FIG. 1 is a cross-sectional view, in elevation, of a portion of a machine having a rotary shaft therein; and FIG. 2 is a fragmentary view in cross-section of the preferred embodiment of the novel seal housing.

As shown in the figures, the machine of FIG. 1, only by way of example, comprises a rotary compressor 10, the same comprising a housing 12, with an end cover 14, which supports a rotary shaft 16. The shaft mounts a rotary piston 18, and the latter is secured in place on the shaft by means of a rotor lock 20. A bearing 22, only a portion of which is shown, supports the shaft 16 rotatably within the housing 12, and is separated from a cartridge or seal housing 24, by means of a load ring 26; load ring 26 positions the shaft within the bearing 22.

The compressor housing 12 has an annular abutment 28 which receives the cartridge or seal housing 24 and a clamp 30, fastened by a clamp screw 32, engages an annular flange 34 on the cartridge or seal housing 24 to secure the latter in place against the abutment 28. O-ring seals 36 envelop the cartridge or seal housing in two places axially spaced apart to opposite sides of a drain channel 38.

The cartridge or seal housing 24 has a central bore 40 and has a plurality of axially spaced-apart annular grooves 42 formed therein. The novel seal retainers 44 are shown in place in the cartridge or seal housing 24, each thereof having an annular lip 46, which engages the corresponding grooves. Seals 48 are fixed against the base 50 of each of the retainers 44 and the foremost one thereof abuts an inwardly-directed annular flange 52 formed on the cartridge or seal housing.

As seen to better advantage in FIG. 2, the retainers 44 each have a tapered surface 56 on the outermost circumference thereof in order that they may be pressed into the cartridge or seal housing 24. Due to this surface taper, and a radiused or rounded edge 58, the retainers negotiate (i.e., traverse) each of the outermost, successive recesses 42 until the corresponding recess therefor is reached, whereupon the lip 46 lockingly engages the (corresponding) recess. Further to accommodate the insertion of the retainers, the outermost recesses 42 each have a slight bevel 59 formed on the inner edge thereof. Accordingly, the radiused or rounded edges 58 use the bevels 59 as ramps to negotiate and traverse the outermost grooves or recesses 42.

At the inner juncture of the wall 60 and the base 50 of each retainer 44 there is formed a slight undercut 62 to facilitate the flexure of circumferential compression of the retainer wall 60, in order that it might be passed through the bore 40. Too, by this provisioning, any distortion of the base 50, arising from insertion of the retainers 44, is minimized or avoided.

Depending upon the pressure to be sealed, one, two, three, or more retainers 44 and seals 48 can be used along the axis of the shaft 16. The three seals 48 and retainers 44 shown in juxtaposition provide for fluid sealing along the shaft. The component intervening between the outermost seal 48 and retainer 44, and the seal 48 and retainer 44 next adjacent, is a spacer 64 of a lantern-ring type, the latter being ported or vented, radially, to accommodate for drainage therethrough. The outermost seal 48 and retainer 44 provide for sealing of lubricant supplied to the bearing 22.

Each of the retainers 44, with a seal 48 enclosed therewithin, defines an intervening annular void 66 of diverging and converging cross-section. In that the right-hand side of the compressor 10 (as shown in FIG. 1) is the high-pressure side, leakage, pressured fluid which insinuates itself into these voids 66 has the beneficial effect of causing a further enhancing of the fluid sealing. The high-pressure fluid expands the walls 60 into a more compressed engagement with the cartridge, or seal housing grooves 42.

The retainers 44 are formed of stiff, albeit slightly resilient material which, at least in the embodiment depicted, is disclosed as plastic. (Of course, the use of metal is not precluded.)

Accordingly, as self-evidently proceeds therefrom, and as noted in the "Abstract of the Invention", the annular lip 46 of each retainer "snaps" into engagement with whichever is its corresponding, furthermost (and accessible) groove 42, upon the cartridge or seal housing 24 being charged with retainers 44. The retainers 44, that is to say, have a reflex or spring-back resilience which causes each to snap into a locked-in positioning (in its corresponding groove 42) by and of itself. Now, while it will not be impossible to retrieve the retainers 44 — a thin-walled annular tool can probably be employed for the purpose — it is proposed to regard the retainers 44 as expendable. Thus, when it is necessary to withdraw one from the cartridge or seal housing 24, it is suggested that it be fractured and broken out of the groove 42, and a new retainer 44 be put in its place.

While I have described my invention in connection with a specific embodiment thereof, it is to be clearly understood that this is done only by way of example and not as a limitation to the scope of my invention as set forth in the objects thereof and in the appended claims.

I claim:

1. Means for housing a seal for fluid-sealing a shaft, comprising:
   first means comprising an annular housing for enveloping a portion of a shaft; and
   second means comprising a stiff, albeit slightly resilient and generally cup-shaped, circular seal retainer for receiving a seal therewithin; wherein
   one of said first and second means has a plurality of spaced-apart grooves formed therein;
   the other of said first and second means has a lip formed thereon;
   any one of said grooves and said lip comprising, respectively, first and second locking elements, for locking said seal retainer within said housing;
   said retainer is disposed within said housing with said lip reflexly or resiliently self-locked in one of said grooves;
   said retainer comprises a circular, generally flat and centrally-apertured base, and an annular wall rising from the periphery of said base, said base and wall cooperating to define an annular, walled recess within said retainer in which to receive a seal;
   an outermost surface of said wall carries one of said locking elements; and further including
   an annular seal, having an external periphery, disposed in said recess; wherein
   said annular wall has an inner surface;
   said periphery and said inner surface are spaced-apart to define a void therebetween;
   said periphery comprises uniformly diminishing diameters; and
   said inner surface of said wall comprises uniformly increasing diameters, defining said void between said seal and retainer wall with an outwardly diverging cross section, whereby pressured fluid introduced into said void urges said wall into a more engaging latching or locking thereof to said housing; and
   ramp means, contiguous with said one groove, for accomodating a slidable displacement of said lip from said one groove to enable locking engagement of said lip with another of said grooves.

2. Means, according to claim 1, wherein:
   said wall has said lip formed thereon, on said outermost surface thereof; and
   said wall has an inwardly-tapered surface externally formed on a terminal edge thereof.

3. Means, according to claim 2, wherein:
   said housing has an inwardly-directed annular flange; and
   said terminal edge forms an abutting interface with a surface of said flange.

4. Means, according to claim 1, further including:
   an annular seal disposed in said recess.

5. Means, according to claim 3, further including:
   an annular seal set against said base and abutting said surface of said flange.

6. Means, according to claim 1, wherein:
   said wall and said base have internal and external junctures; and
   one of said junctures has an annular undercut formed therein.

7. Means, according to claim 6, wherein:
   said undercut is formed in said internal juncture.

8. Means, according to claim 1, wherein:
   said seal retainer is at least partially circumferentially and resiliently compressible.

* * * * *